United States Patent
Cha et al.

(10) Patent No.: US 8,416,341 B2
(45) Date of Patent: Apr. 9, 2013

(54) 3D IMAGE DISPLAY DEVICE

(75) Inventors: Kyung-hoon Cha, Yongin-si (KR); Dae-sik Kim, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1785 days.

(21) Appl. No.: 11/395,332

(22) Filed: Apr. 3, 2006

(65) Prior Publication Data
US 2006/0227419 A1    Oct. 12, 2006

(30) Foreign Application Priority Data
Apr. 1, 2005   (KR) .................. 10-2005-0027554

(51) Int. Cl.
*H04N 5/225*    (2006.01)
(52) U.S. Cl. ........ 348/372; 348/373; 348/374; 348/375; 348/376
(58) Field of Classification Search .......... 348/372–376; 352/52, 53, 243
See application file for complete search history.

(56) References Cited

U.S. PATENT DOCUMENTS

| | | | | |
|---|---|---|---|---|
| 5,886,675 | A * | 3/1999 | Aye et al. | 345/7 |
| 5,917,460 | A * | 6/1999 | Kodama | 345/8 |
| 6,049,424 | A | 4/2000 | Hamagishi | |
| 6,556,185 | B2 | 4/2003 | Rekimoto | |
| 2003/0160867 | A1* | 8/2003 | Ohto et al. | 348/135 |
| 2003/0217609 | A1* | 11/2003 | Fujimoto et al. | 74/5.6 D |
| 2005/0068293 | A1* | 3/2005 | Satoh et al. | 345/158 |
| 2006/0132675 | A1 | 6/2006 | Choi et al. | |
| 2006/0164382 | A1* | 7/2006 | Kulas et al. | 345/156 |

FOREIGN PATENT DOCUMENTS

| | | |
|---|---|---|
| JP | 06-078248 A | 3/1994 |
| JP | 06-318058 A | 11/1994 |
| JP | 7-13105 A | 1/1995 |
| JP | 08-289227 A | 11/1996 |
| JP | 08-330943 A | 12/1996 |
| JP | 2000-353179 A | 12/2000 |
| JP | 2003-018501 A | 1/2003 |
| KR | 1998-019288 A | 6/1998 |
| KR | 10-2001-0074220 A | 8/2001 |
| KR | 10-0415161 B1 | 12/2003 |

OTHER PUBLICATIONS

Communication from the Korean Patent Office issued on Jun. 29, 2011 in the corresponding Korean Patent Application No. 10-2005-0027554.

Chinese Office Action for counterpart Chinese Patent Application No. 200610008228.0, dated Jun. 15, 2007.

* cited by examiner

*Primary Examiner* — Yogesh Aggarwal
(74) *Attorney, Agent, or Firm* — Sughrue Mion, PLLC

(57) ABSTRACT

A 3D image display device is provided. The 3D image display device can sense a posture change of a 3D display using a gyro-sensor and prevent an image for an LE and an image for an RE from being converted using a sensed posture change. The 3D image display device includes a main body a multi-view type display, a gyro-sensor, and an image-conversion controller. The multi-view type display provides a 3D image for an LE and a 3D image for an RE. The gyro-sensor is mounted in the main body to sense a posture change of the display and the image-conversion controller prevents conversion of a provided 3D image using the posture change of the display sensed by the gyro-sensor. Therefore, an image signal for an RE and an image signal for an LE are provided to viewing regions where an RE and an LE of a viewer are located, so that the viewer can view a 3D image properly.

9 Claims, 8 Drawing Sheets

3D IMAGE DISPLAY DEVICE

CROSS-REFERENCE TO RELATED PATENT APPLICATION

This application claims the benefit of Korean Patent Application No. 10-2005-0027554, filed on Apr. 1, 2005, in the Korean Intellectual Property Office, the disclosure of which is incorporated herein in its entirety by reference.

BACKGROUND OF THE INVENTION

1. Field of the Invention

The present invention relates to a 3-dimensional (3D) image display device using a gyro-sensor, and more particularly, to a 3D image display device capable of sensing a posture change of a 3D display through a gyro-sensor and preventing mutual conversion between a left image and a right image using the sensed posture change.

2. Description of the Related Art

A 3D image display device is a device separating an image for a left eye (LE) and an image for a right eye (RE) having binocular parallax and providing the images to an LE and an RE of a viewer, respectively. Therefore, a viewer can view a 3D image by combining, at his brain, an image for an LE and an image for an RE obtained through the retina of the two eyes of the viewer. The 3D image display device can be widely applied to a variety of fields requiring a 3D image such as medical treatment, games, advertisements, education, and military affairs.

FIG. 1 is a schematic view of a general 3D image device. Referring to FIG. 1, the 3D image device includes an image screen 1 providing images for an LE (L1, L2, L3, L4, L5, and L6) and images for an RE (R1, R2, R3, R4, R5, and R6) and a lenticular screen 3 disposed at the front of the image screen 1 and separating viewing regions.

Each of the images for the LE and the images for the RE is photographed by two cameras spaced apart to correspond to an interval between the LE and the RE of a viewer and has a difference as much as an average binocular parallax. The two images obtained in this manner are provided through the image screen 1 and the lenticular screen 3. At this point, the images for the LE and the images for the RE consist of a plurality of divided images and the divided images are alternately provided as illustrated.

The lenticular screen 3 directs the images for the LE provided from the image screen 1 to a left-image viewing region marked by a dotted line and directs the images for the RE to a right-image viewing region marked by another dotted line. Therefore, the two separated images are projected on locations spaced a distance D from the lenticular screen 3, respectively. When the LE and the RE of a viewer are positioned in the left-image viewing region and the right-image viewing region, respectively, the viewer can appreciate a 3D image by viewing the viewing-region separated images through the two eyes LE and RE.

However, the above 3D image display device has a limitation that a viewer can view a 3D image only when the LE and the RE of the viewer are positioned in the left-image viewing region and the right-image viewing region, respectively.

Therefore, for a viewer to view a 3D image in various directions, a multi-view type 3D image display device of a structure as illustrated in FIG. 2 has been suggested. FIG. 2 illustrates separating image signals for an RE and an LE into four viewing regions, respectively, and providing the same.

Referring to FIG. 2, a 3D image display device 5 includes a screen 7 providing image signals for an RE and an LE, and a lenticular lens 9 disposed on the front of the screen 7 and separating viewing regions of the images impinging on the screen 7. Therefore, 3D images provided on the screen 7 are viewing region-separated at the lenticular lens 9 and provided to viewing regions 1 through 8. Here, the image signals for the RE are provided to the viewing regions 1, 3, 5, and 7, and the image signals for the LE are provided to the viewing regions 2, 4, 6, and 8.

Therefore, viewers whose REs and LEs are positioned in the viewing regions 1 and 2, the viewing regions 3 and 4, the viewing regions 5 and 6, and the viewing regions 7 and 8, respectively, can view a 3D image provided from the display device 5. On the contrary, when REs and LEs of viewers are positioned in the viewing regions 2 and 3, the viewing regions 4 and 5, and the viewing regions 6 and 7, the viewers view the image signals for the LEs through the REs and view the image signals for the REs through the LEs.

For example, a viewer (USER 1) whose RE and LE are positioned in the viewing regions 5 and 6 can view a normal 3D image properly. On the contrary, a viewer (USER 2) whose RE and LE are positioned in the viewing regions 2 and 3 views a 3D image whose left and right are mutually converted.

Also, in the case where a multi-view type 3D image display device of the related art is applied to a portable electronic device (e.g., a personal digital assistant (PDA), a cellular phone), a viewing region changes when the position of the image display device relatively changes with respect to a viewer. Therefore, a left image might be converted into a right image and a right image might be converted into a left image depending on a relative position of a viewer.

SUMMARY OF THE INVENTION

The present invention provides a 3D image display device capable of preventing mutual conversion of an image for an LE and an image for an RE by sensing a position change of a display.

According to an aspect of the present invention, there is provided a 3D image display device including: a main body; a multi-view type display providing a 3D image for a left eye and a 3D image for a right eye; a gyro-sensor mounted in the main body and sensing a posture change of the display; an image-conversion controller preventing conversion of a 3D image using a posture change of the display sensed by the gyro-sensor, a viewer viewing an image signal for a left eye and an image signal for a right eye at a viewing region where a right eye and a left eye of the viewer are positioned.

The image-conversion controller may include a signal-conversion part converting an image signal for a left eye and an image signal for a right eye, the controller sensing a relative position change of the display with respect to the viewer using the gyro-sensor to judge whether a left eye and a right eye of the viewer are positioned in an initial viewing region for a right eye and an initial viewing region for a left eye, respectively; when the left eye being positioned in a viewing region for the right eye and the right eye being positioned in a viewing region for the left eye, an image signal for a left eye and an image signal for a right eye being converted to each other using the signal conversion part so as to prevent left-right conversion of a provided 3D image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
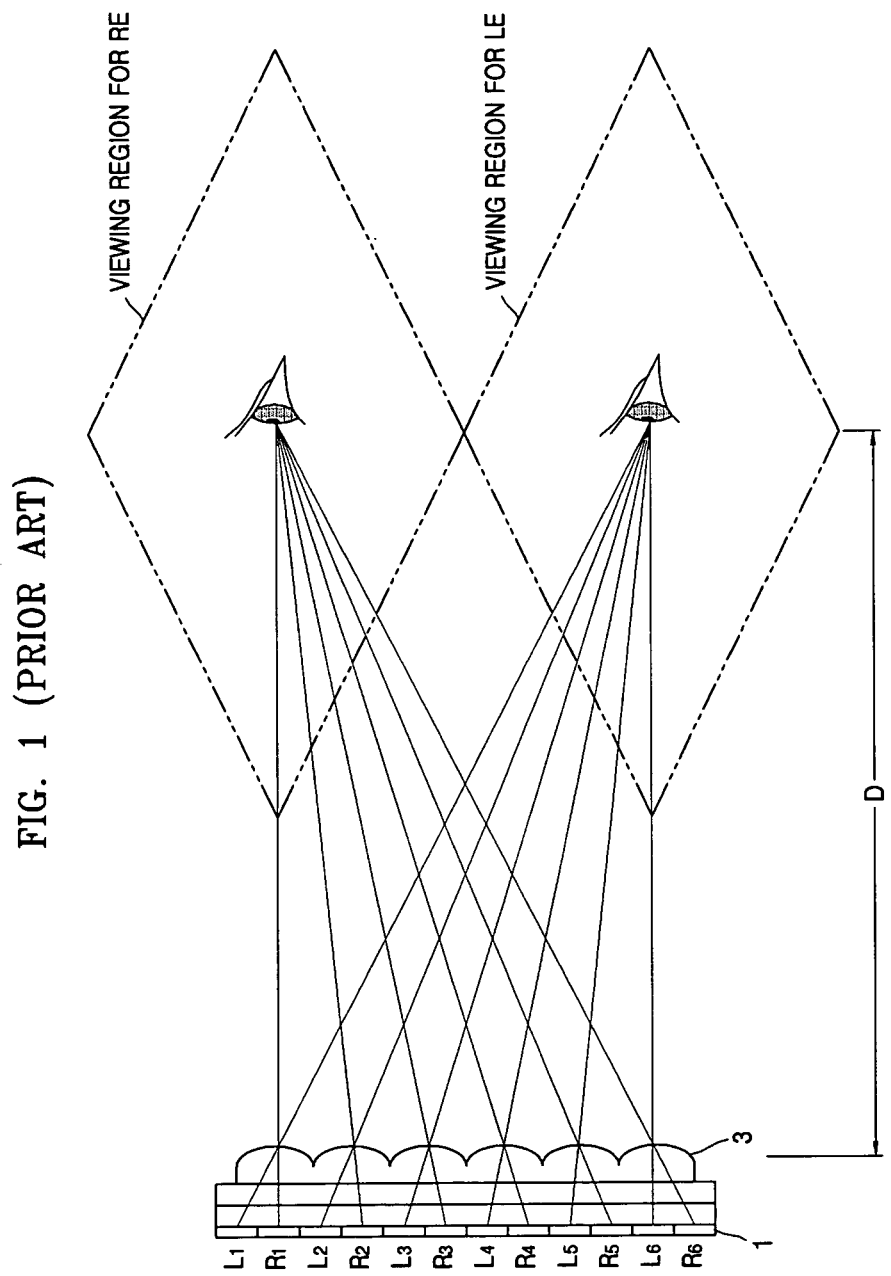
FIG. 1 is a schematic view of a general 3D image display device.
Figure 2:
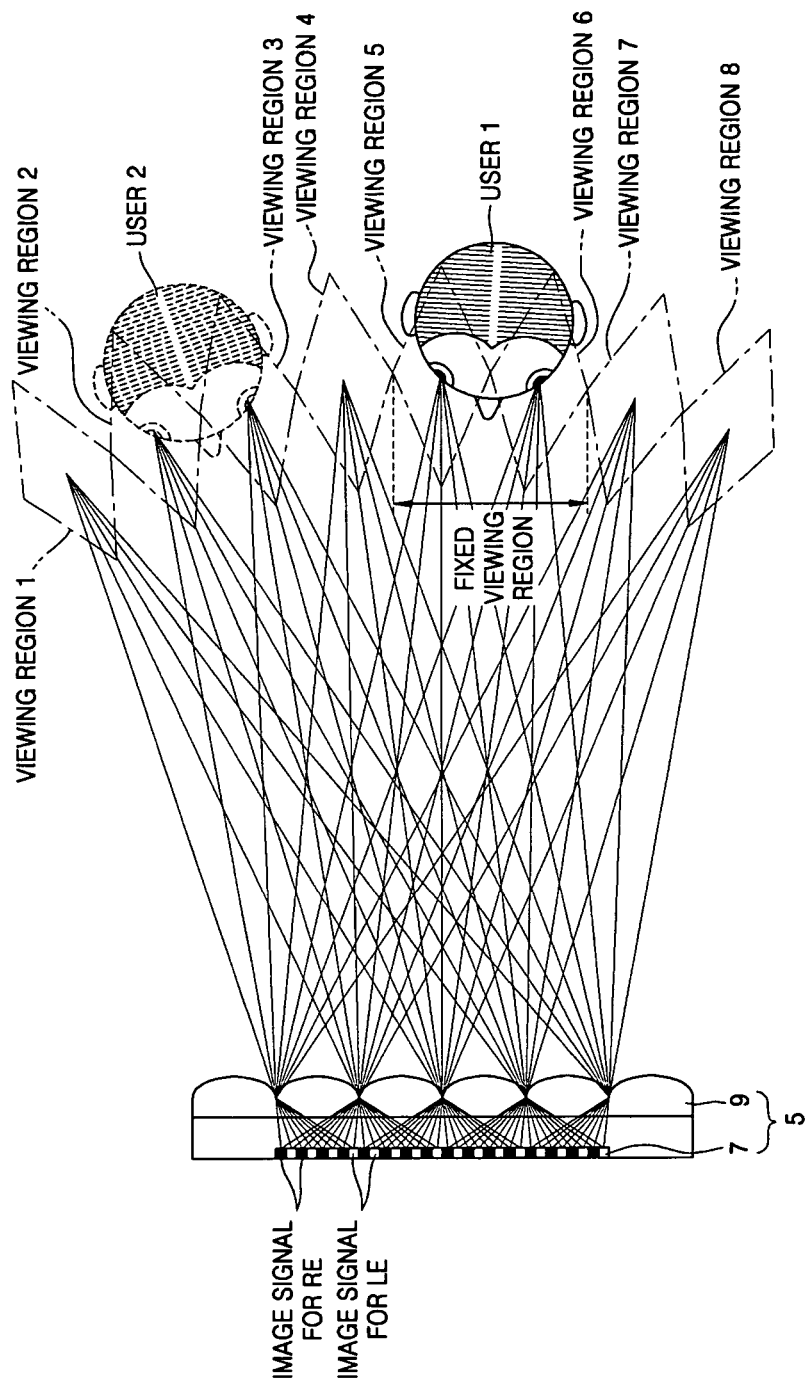
FIG. 2 is a schematic plan view of a 3D image display device according to the related art.
Figure 3:
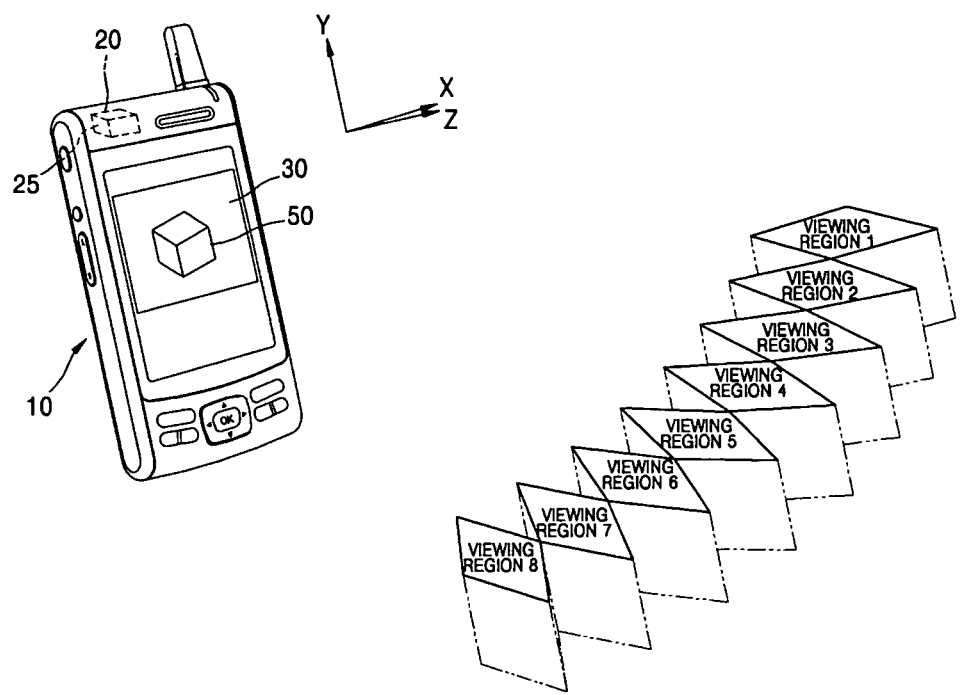
FIG. 3 is a schematic perspective view of a 3D image display device according to an embodiment of the present invention.
Figure 4:
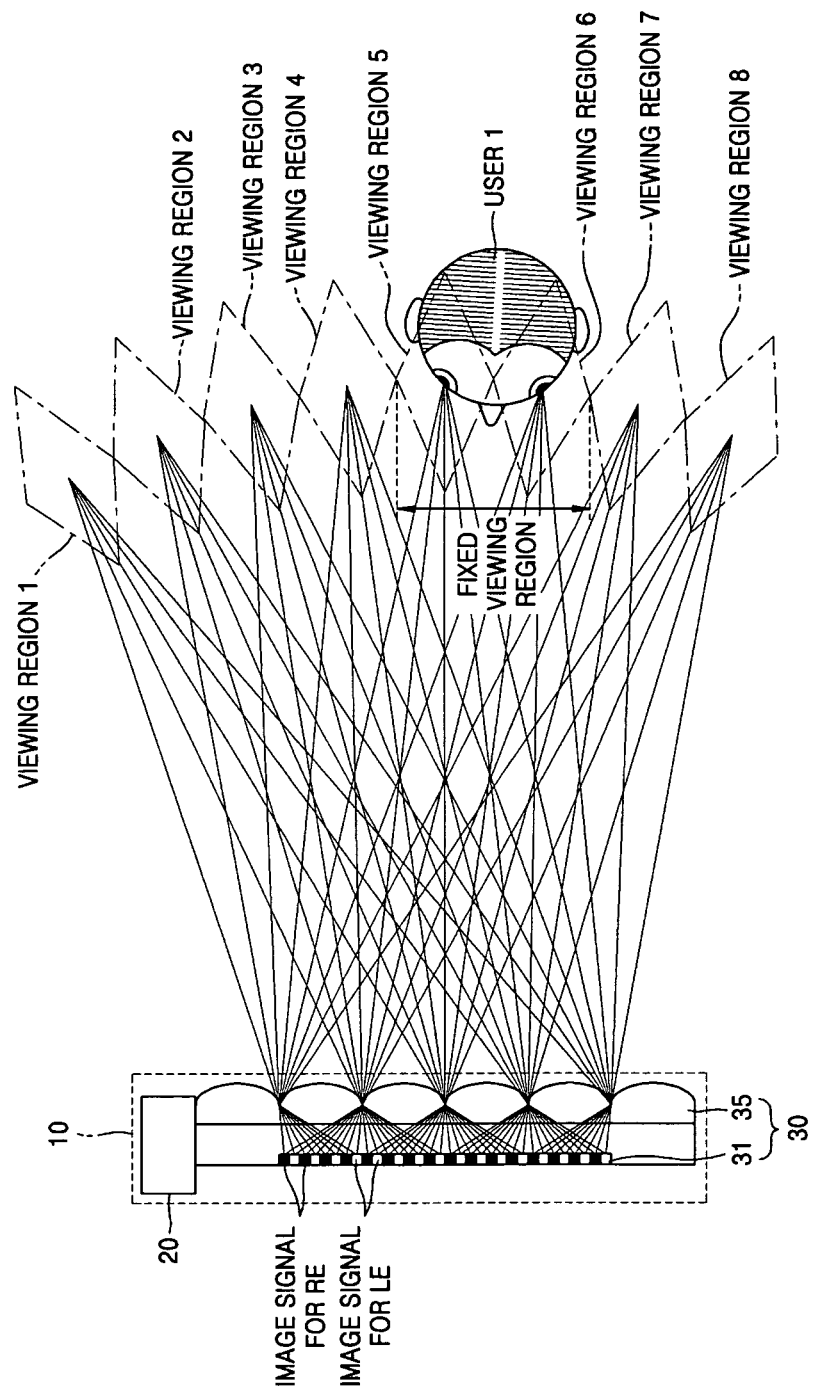
FIG. 4 is a view illustrating viewing regions separated in a 3D image display device of FIG. 3.

FIG. 3 is a schematic perspective view of a 3D image display device according to an embodiment of the present invention. FIG. 4 is a view illustrating viewing regions are separated in a 3D image display device of FIG. 3. And FIG. 5 is a schematic block diagram of a 3D image display device of FIG. 3.

Figure 5:
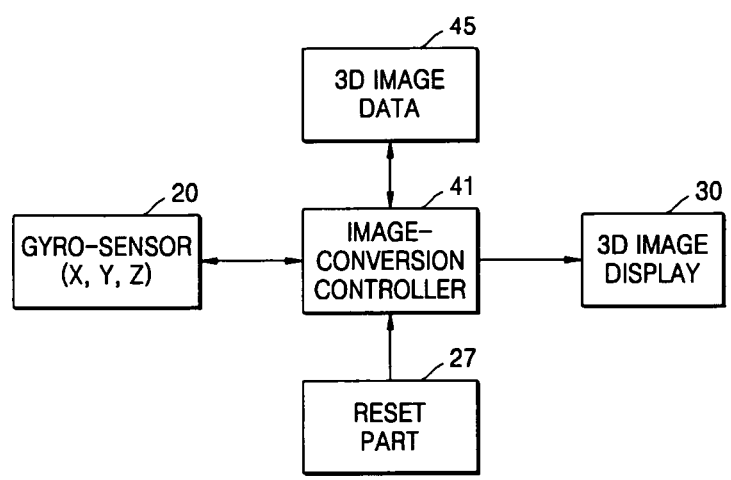
FIG. 5 is a schematic block diagram of a 3D image display device of FIG. 3.

Referring to FIGS. 3 through 5, the 3D image display device includes a main body 10, a multi-view type 3D image display 30 mounted within the main body 10 and providing a 3D image 50, a gyro-sensor 20 mounted in the main body 10 and sensing a posture change of the display 30, and an image-conversion controller 41.

The main body 10 is a device providing a 3D image and can be a personal digital assistant (PDA) in the present embodiment. The main body 10 is not limited to a PDA but can be a digital portable device (e.g., a cellular phone, a notebook computer), a digital television, or a monitor, for example.

The display 30 includes a screen 31 providing a 3D image for an LE and a 3D image for an RE and a viewing-region separation part separating viewing regions of a 3D image present on the screen 31. Provided 3D image data 45 is projected on the screen 31. As illustrated, the viewing-region separation part includes a lenticular lens 35 or a parallax barrier (not shown) disposed on the front of the screen 31 and separates viewing regions of a left-3D image and a right-3D image projected on the screen 31. Since the construction of the display realizing a 3D image is well known in the art as described above, detailed description thereof will be omitted.

The gyro-sensor 20 is mounted within or on the outside of the main body 10 to sense a posture change of the display 30. That is, the gyro-sensor 20 is a kind of an inertia sensor and senses a posture change of the display 30 in X, Y, and Z-axis directions. For example, in the case where a viewer (USER 1) holds the main body 10 in his hand and rotates the main body 10 to the right and left around the Y-axis, the gyro-sensor 20 can sense a displacement of the display 30 with respect to an X-axis direction.

In the present embodiment, a reset part 27 setting an initial value of the gyro-sensor 20 may be further provided. The reset part 27 is connected with a reset button 25 formed on the exterior of the main body 10 to reset coordinates (X, Y, Z) of a position to (0, 0, 0) when a viewer presses the reset button 25 at an arbitrary position. Therefore, a relative position of the changing posture of the main body 10 and the display 30 can be sensed using a reset position for an initial reference position. Here, since the construction of the gyro-sensor 20 itself is well known in the art, detailed description thereof will be omitted.

The image-conversion controller 41 prevents a conversion of a provided 3D image using a posture change of the main body 10 sensed by the gyro-sensor 20. For that purpose, the image-conversion controller 41 includes a signal-conversion part converting an image signal for an LE and an image signal for an RE.

To determine whether an image signal has been converted or not, a relative position change of the display 30 with respect to the viewer is sensed by the gyro-sensor 20 first to judge whether an RE and an LE of the viewer are positioned in an initial viewing region for an RE and an initial viewing region for an LE, respectively. Whether the RE and the LE of the viewer are positioned in the relevant viewing regions, respectively, can be judged on the basis of a viewing region division as illustrated in FIG. 6.

Figure 6:
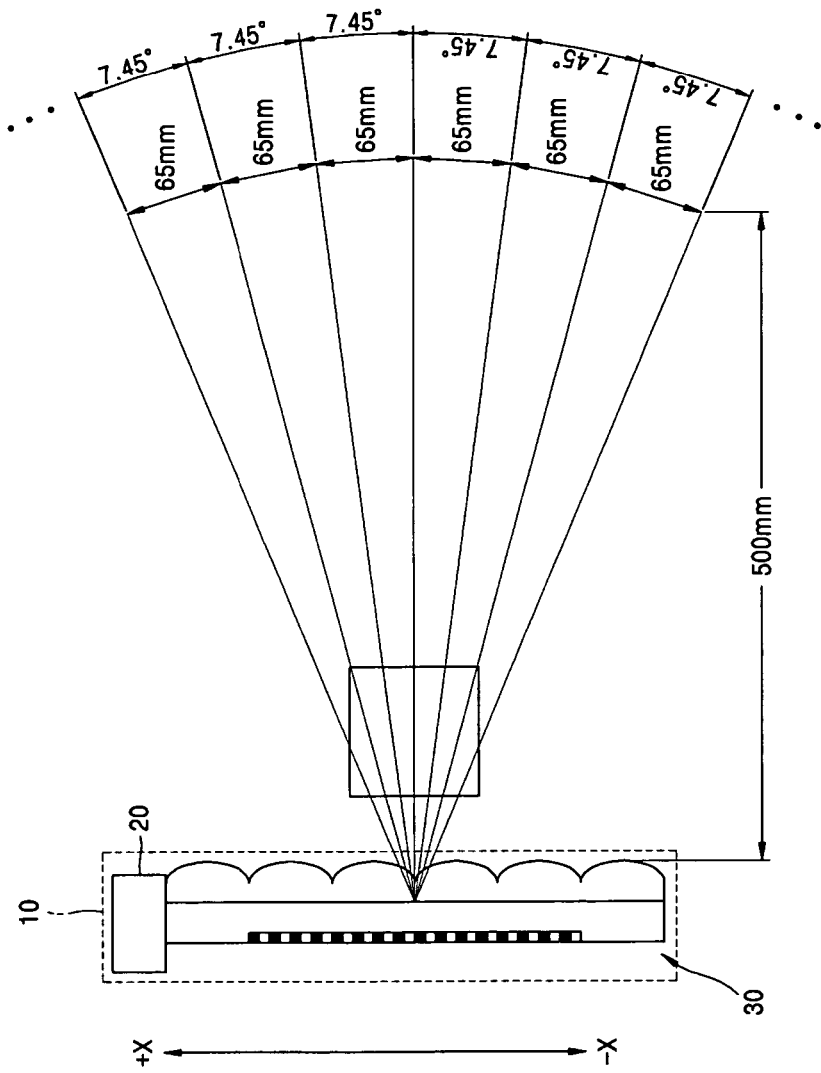
FIG. 6 is a view explaining a relationship between a viewing region and a viewing angle in a 3D image display device according to an embodiment of the present invention.

FIG. 6 is a view explaining a relationship between a viewing region and a viewing angle in a 3D image display device according to an embodiment of the present invention. Referring to FIG. 6, in the case where an optimum viewing distance from the main body 10 is set to about 500 mm and a distance between an RE and an LE of a viewer is set to about 65 mm, a viewing angle of the respective viewing regions is about 7.45°.

A rotation degree of the main body 10 with respect to an initial reset can be known using the relationship between the viewing region and the viewing angle and the sensing of the posture change of the display 30 by the gyro-sensor 20. Also, in which viewing region an RE and an LE of the viewer (USER 1) positioned in a fixed viewing region are positioned can be known.

Therefore, when an RE of a viewer is positioned in the viewing regions 1, 3, 5, or 7 and an LE of a viewer is positioned in the viewing regions 2, 4, 6, or 8, an image signal for an RE is provided to the viewing regions 1, 3, 5, and 7 without conversion of a provided image signal and an image signal for an LE is provide to the viewing regions 2, 4, 6, and 8 without conversion of a provided image signal, so that the viewer can view a 3D image properly.

Figure 7:
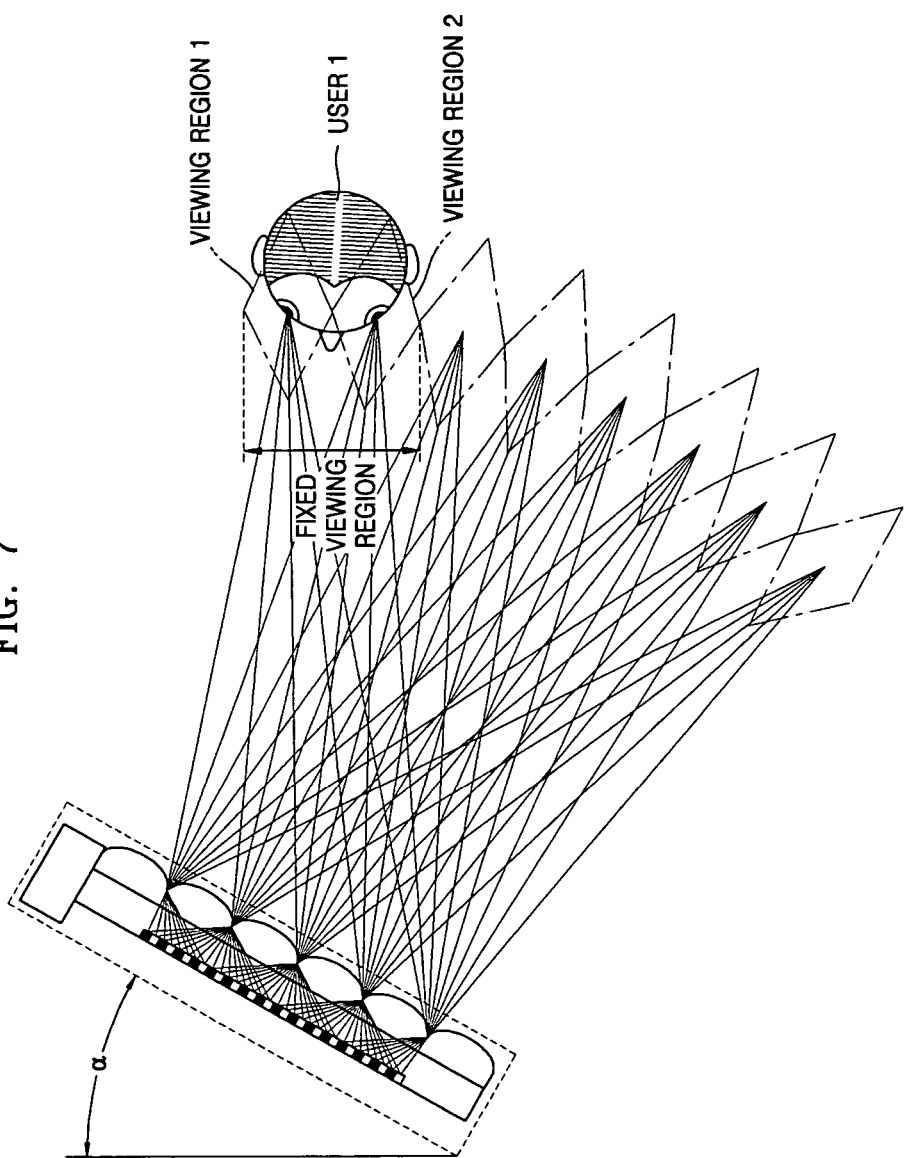
FIGS. 7 and 8 are views explaining an operation of a 3D image display device according to an embodiment of the present invention.

FIG. 7 illustrates the case where an RE and an LE of a viewer (USER 1) are positioned in viewing regions 1 and 2.

That is, FIG. 7 illustrates the case where the main body 10 is rotated clockwise by an angle α compared with the case of FIG. 3 with the viewer (USER 1) positioned in the fixed viewing region. In that case, an RE and an LE of the USER 1 are positioned in the viewing regions 1 and 2, respectively. Here, the gyro-sensor senses the changed posture of the main body and delivers posture information to the image-conversion controller 41. The image-conversion controller 41 determines in which viewing region an RE and an LE of the USER 1 are positioned on the basis of a rotation-angle-change amount of the main body 10. In the case where the RE and the LE of the USER 1 are positioned in the viewing regions 1 and 2, respectively, an image signal for an RE is provided to the viewing region 1 without conversion of a provided 3D image and an image signal for an LE is provide to the viewing region 2 without conversion, so that the USER 1 can view a 3D image.

On the contrary, when an LE of a viewer is positioned in the viewing regions 1, 3, 5, or 7 and an RE of a viewer is positioned in the viewing regions 2, 4, 6, or 8, a signal conversion by the image-conversion controller 41 is required. That is, an image signal for an LE is provided to the viewing regions 1, 3, 5, and 7 through conversion of a provided image signal and an image signal for an RE is provided to the viewing regions 2, 4, 6, and 8, so that the USER 1 positioned in a fixed viewing region can view a 3D image properly.

Figure 8:
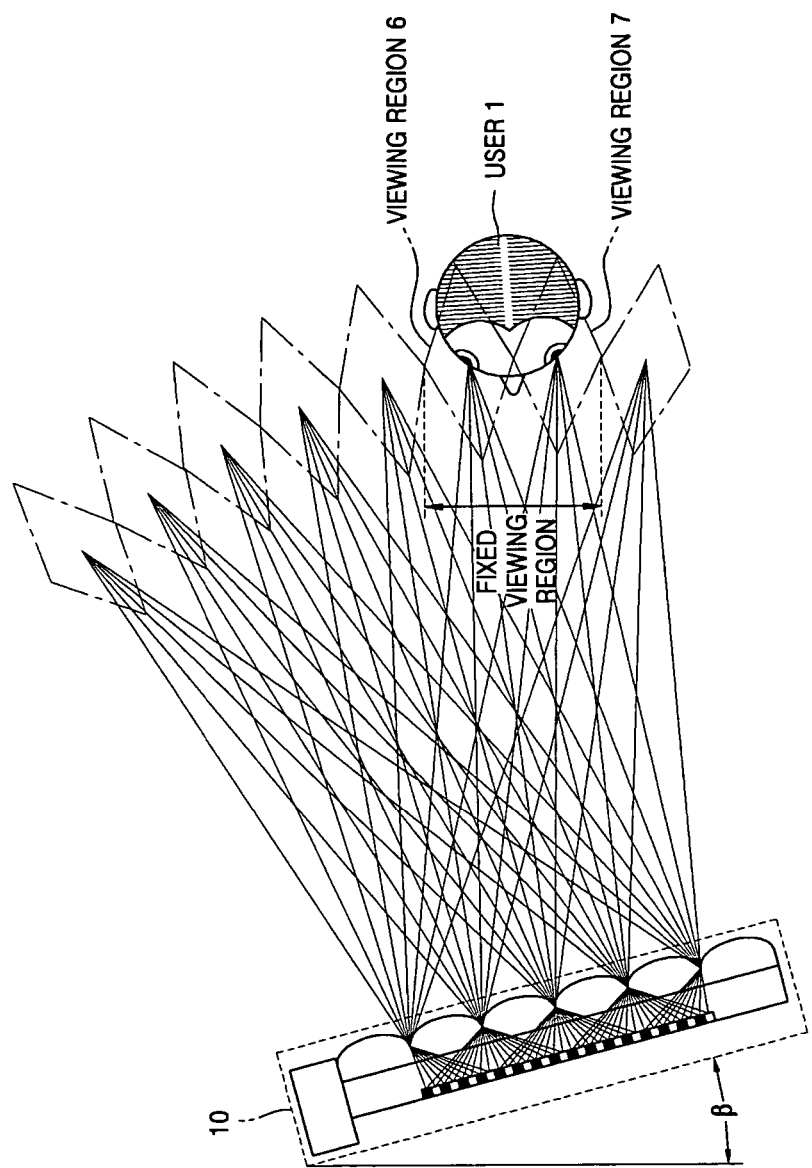

FIG. 8 illustrates the case where an RE and an LE of a viewer (USER 1) are positioned in the viewing regions 6 and 7. That is, FIG. 8 illustrates the case where the main body 10 is rotated counterclockwise by an angle β compared with the case of FIG. 3 with the viewer (USER 1) positioned in the fixed viewing region. In that case, an RE and an LE of the USER 1 are positioned in the viewing regions 6 and 7, respectively. Here, the gyro-sensor senses the changed posture of the main body 10 and delivers posture information to the image-conversion controller 41. The image-conversion controller 41 determines in which viewing region an RE and an LE of the USER 1 are positioned on the basis of a rotation-angle-change amount of the main body 10. In the case where the RE and the LE of the USER 1 are positioned in the viewing regions 6 and 7, respectively, a provided image signal is converted and the converted image signal for an RE is provided to the viewing region 6 and the converted image signal for an LE is provided to the viewing region 7, so that the USER 1 can view a 3D image properly.

As described above, the 3D image display device senses the posture of the display using the gyro-sensor mounted in the main body to determine whether a provided 3D image has been converted according to a relative position change between a viewer and the display. Therefore, a dead zone where a viewer cannot view a 3D image is eliminated, so that an image for an RE can be provided to an RE of a viewer and an image for an LE can be provided to an LE of a viewer even though a viewer changes his position.

The above-described 3D image display device can be widely applied to LCDs, PDPs, flat display devices, 3D-game image display devices, 3D televisions for broadcasting, 3D displays for military purposes, 3D displays for simulation training, and 3D displays for medical purposes, as well as portable display devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A 3D image display device comprising:
    a main body;
    a multi-view type display which provides a 3D image for a left eye and a 3D image for a right eye;
    a gyro-sensor which is mounted in the main body and senses a posture change of the display; and
    an image-conversion controller which prevents conversion of a 3D image using the posture change of the display sensed by the gyro-sensor, so that a viewer views an image signal for the left eye and an image signal for the right eye in a viewing region where the right eye and the left eye of the viewer are positioned,
    wherein the image-conversion controller comprises a signal-conversion part which converts an image signal for the left eye and an image signal for the right eye,
    the controller senses a relative position change of the display with respect to the viewer using the gyro-sensor to judge whether the left eye and the right eye of the viewer are positioned in an initial viewing region for the right eye and an initial viewing region for the left eye, respectively, and
    when the left eye is positioned in the viewing region for the right eye and the right eye is positioned in the viewing region for the left eye, an image signal for the left eye and an image signal for the right eye are converted to each other using the signal-conversion part so as to prevent left-right conversion of a provided 3D image.

2. The 3D image display device of claim 1, further comprising:
    a reset part setting an initial value of the gyro-sensor that sets an arbitrary position of the display to an initial position by selection of a viewer.

3. The 3D image display device of claim 1, wherein the gyro-sensor is mounted within or on an exterior of the main body.

4. The 3D image display device of claim 1, wherein the display comprises:
    a screen mounted within the main body and on which 3D image data selected by the controller is projected; and
    a viewing region-separation part separating the 3D image projected on the screen into an image for a left eye and an image for a right eye.

5. The 3D image display device of claim 1, wherein the gyro-sensor is disposed within or on an exterior surface of the main body.

6. The 3D image display device of claim 2, wherein the gyro-sensor senses a rotational displacement of the main body in X, Y, and Z axes of the display, with respect to the initial position.

7. The 3D image display device of claim 6, wherein:
    the viewing region comprises separate left eye viewing regions and right eye viewing regions, for the left eye image signal and the right eye image signal, respectively, and
    the image-conversion controller prevents conversion of the left eye image into the right eye image and vice versa in the left eye viewing regions and the right eye viewing regions with respect to the viewer, based on the rotational displacement.

8. The 3D image display device of claim 7, wherein the signal-conversion part converts the left eye image signal and the right eye image signal to one another, if the rotational displacement indicates a position of the viewer with respect to the left eye viewing regions and the right eye viewing regions such that the left eye of the viewer is positioned in one of the right eye viewing regions and the right eye of the viewer is positioned in one of the left eye viewing regions.

9. The 3D image display device of claim 8, wherein the signal-conversion part omits converting the left eye image signal and the right eye image signal to one another, if the rotational displacement indicates the position of the viewer with respect to the left eye viewing regions and the right eye viewing regions such that the left eye of the viewer is positioned in one of the left eye viewing regions and the right eye of the viewer is positioned in one of the right eye viewing regions.

* * * * *